United States Patent                                         [15]   3,676,524
Takiyama et al.                                               [45]   July 11, 1972

[54] VINYL ESTER RESINS PREPARED WITH AN ADDITION COMPOUND OF A SECONDARY AMINE-ACID SALT CATALYST

[72] Inventors: Eiichiro Takiyama, Tokyo; Sadakazu Hokamura, Yamato, both of Japan

[73] Assignee: Showa Highpolymer Co., Ltd., Tokyo, Japan

[22] Filed: July 27, 1970

[21] Appl. No.: 58,663

[52] U.S. Cl. ................. 260/837 R, 260/78.4 EP, 260/836
[51] Int. Cl. ........................................... C08g 45/04
[58] Field of Search ............................... 260/836, 837

[56] References Cited

UNITED STATES PATENTS

| | | | |
|---|---|---|---|
| 3,373,075 | 3/1968 | Fekete | 260/837 |
| 3,377,406 | 4/1968 | Newey | 260/837 |
| 3,432,478 | 3/1969 | May | 260/837 |

*Primary Examiner*—Paul Lieberman
*Attorney*—Wenderoth, Lind & Ponack

[57] ABSTRACT

A process for producing unsaturated ester resins which can use an accelerator containing an organic acid and an organic salt of cobalt in their cure, the process comprising heat reacting an epoxy resin having at least one epoxy group in its molecular structure with an unsaturated monobasic acid in the presence, as catalyst, of an addition compound of a secondary amine and an acid of the group consisting of inorganic and organic acids.

10 Claims, No Drawings

VINYL ESTER RESINS PREPARED WITH AN ADDITION COMPOUND OF A SECONDARY AMINE-ACID SALT CATALYST

This invention relates to a process for producing unsaturated ester resins which are obtained by adding a copolymerizable monomer (hereinafter referred to merely as monomer) to a reaction product of an unsaturated acid and an epoxy compound (or an epoxy resin) containing at least one epoxy group in its molecular structure.

It is known that both the unsaturated polyester resins and epoxy resins are being evidently used for coating, lining, laminating and molding purposes and that the amount being used is showing a steady increase. However, while the unsaturated polyester and epoxy resins are competitive, at times, as to their ease of management, performance and cost, they are usually being discriminated even their intended use is the same. That is, in the case of the unsaturated polyesters, the curing method is simple and they are superior with respect to their ease of management. While, their performance after the cure do not compare favorably with the epoxy resins in some respects, the foregoing advantages along with the their low cost is responsible for their being used in an overwhelmingly greater amount than in the case of the epoxy resins, the use of the former being estimated to be nearly tenfold that of the latter.

On the other hand, the superior performance of the epoxy resins subsequent to their cure having been recognized, they are finding uses in fields which require high performances of an order such as cannot possibly be realized by the unsaturated polyesters. The epoxy resins are characterized by their diversity as to their management and curing method. However, generally speaking, as compared with the unsaturated polyester resins, they are unsatisfactory in many respects, such as the regulation of the curing time and control over the generation of heat. And in most cases the demonstration of their superior performance cannot be realized unless the heating is carried out for a prolonged period of time.

While the high cost is, of course, one of the reasons why, the epoxy resins in spite of their possession of excellent properties, are not used in an amount equal to that of the unsaturated polyesters, another reason is conceivably this troublesomeness as to their management. In contrast, the unsaturated polyesters are far superior to the epoxy resins in respect of their ease of management, and the curing thereof is imposed no restrictive. The greatest drawback in the case of the unsaturated polyester resins is the fact that their shrinkage during the cure is great, and this becomes a major cause for the impairment of the properties of the resin. Hence, if it were possible to combine the properties of the epoxy resins with the workability of the unsaturated polyesters, exceedingly desirable results would be obtained.

In view of the foregoing reasons, we conducted researches with a view to improving upon the workability of the epoxy resins. As a result, we succeeded in the production of a modified epoxy resin which could satisfy the foregoing objective.

Thus, the present invention provides a process wherein an epoxy compound having at least one epoxy group in its molecular structure and an unsaturated monobasic acid or in which, if necessary, a part or a major part of the unsaturated monobasic acid is substituted by at least one compound selected from among the saturated monobasic acids, saturated polybasic acids, saturated polybasic anhydrides, unsaturated polybasic anhydrides, unsaturated polybasic acids and unsaturated polybasic anhydrides, are heat reacted in the presence of a polymerization inhibitor, a specific catalyst and, if necessary, a solvent or a polymerizable monomer, followed by dissolving the reaction product in a solvent or a polymerizable monomer, if necessary, whereby is produced an unsaturated ester resin which is capable of being cured by means of peroxides at room temperature.

It was found that the so prepared epoxy ester resins possessed conjointly the good points that were possessed by the epoxy resins as well as those possessed by the unsaturated polyester resins. When the diglycidyl ether type of 2,2'-bis(4-hydroxyphenyl) propane is used as the epoxy compound, a method of using the quaternary ammonium salts as the catalyst for the reaction has been proposed.

The quaternary ammonium salts excel as catalyst for the reaction, and their use in the production of resins may be said to present no problems. However, in the stage in which the unsaturated ester resin is to be cured subsequent to the reaction, the presence of the quaternary ammonium salts becomes exceedingly disadvantageous for the following reasons. Namely, the unsaturated ester resins containing the quaternary ammonium salts to an extent such as to become a catalyst of the reaction cannot be cured with the use of methyl ethyl ketone peroxide and cobalt naphthenate, which are usually used for curing the unsaturated polyesters. It is, however, possible to effect their cure by the conjoint use of benzoyl peroxide and dimethylaniline. The use of this type of curing agent has, however, the drawback that in the case of the various uses to which the unsaturated ester resins are applied, i.e., lining, gel coating and molding of fiber-reinforced plastics, the surface which is exposed to air does not harden but remains tacky. This drawback is not solved even by the incorporation of paraffin. Hence, this becomes a fatal defect in the actual application of the resin.

The catalytic activity of the salts of tertiary amines are regarded as being weaker than that of the quaternary ammonium salts, but it is not an impossibility to use them as catalyst for a reaction. However, the salts of tertiary amines still possess the defects that the quaternary ammonium salts exhibit during the curing of the resin, though to a somewhat lesser extent. In addition, their preservation is exceedingly poor when allow to stand after addition of the catalyst only. For example, when left standing at room temperature after admixture of 1 percent of benzoyl peroxide, a period of preservation of only about 6 – 10 hours is demonstrated. This is a great disadvantage and hence is not a desirable thing when carrying out the formation of filaments winding.

The present invention is directed to a process for producing unsaturated ester resins by the synthesis from an epoxy compound synthesized principally from epichlorohydrin and a compound containing a hydroxyl group, and an unsaturated monobasic acid, with or without the conjoint use of saturated monobasic acids, unsaturated and saturated polybasic acids and the anhydrides thereof. Further, the present invention makes it possible to utilize methyl ethyl ketone peroxide and the cobalt naphthenate type curing agents, which could not be used heretofore, and an object of the invention is to greatly widen the field in which the unsaturated ester resins can be used.

Thus, the present invention was developed on the basis of our discovery that in the production of unsaturated ester resins using an epoxy compound and an unsaturated monobasic acid and, if necessary, conjointly using, in addition, the saturated monobasic acids, unsaturated and saturated polybasic acids and the anhydrides thereof, the use, as catalyst, of an addition compound of a secondary amine and an inorganic acid (inclusive of Lewis acids) or an organic acid had the effect of not only making for the smooth and prompt execution of the reaction but also of improving the durability of the resulting unsaturated ester resins.

The addition compound of a primary amine and an acid being very weak in its catalytic activity in preparing resins is not of practical use. Even if resins were prepared with such a catalyst, the curability would not be improved at all. Hence such a catalyst is not suitable for achieving the objects of the present invention.

Hence, it is only by the use of an addition compound of a secondary amine and an acid according to the invention is it possible to obtain the advantages of carrying out the reaction smoothly during the production of the resin without impairment of its curability.

The amount used of the foregoing catalyst will depend on the class of the secondary amine and acid used but a range of 0.001 – 15 percent will do, the optimism amount ranging from 0.1 to 2 percent in most cases.

The addition compound of a secondary amine and an acid which can be used in the invention include, for example, the following: diethylamine hydrochloride, dibutylamine hydrochloride, methylethylamine hydrochloride, dibutylamine hydrochloride, the addition product of piperidine and boron trifluoride, N-methylaniline hydrochloride, dimethylamine oxalate, dimethylamine formate, dimethylamine acetate, dimethylamine caprylate, dimethylamine benzoate, dimethylamine maleate, dimethylamine acrylate, and the organic acid salts of diethylamine and diphenylamine.

As the epoxy compounds which are to be used in the invention as the starting material of the unsaturated ester resins, included, for example, are the following: a diglycidyl ether prepared by reacting 2,2-bis(4-hydroxyphenyl) propane and either epichlorohydrin or methyl epichlorohydrin, a diglycidyl ether prepared by reacting a glycol and either epichlorohydrin or methyl epichlorohydrin, the polyglycidyl ethers prepared by the reaction of epichlorohydrin or methyl epichlorohydrin with the so-called novolak obtained by reacting phenol with formaldehyde, and the tetraglycidyl ether of tetraphenylene ethane. Needless to say, the epoxy compounds which are more reactive with the organic acids than the amines obtained by epoxidizing the double bond in the molecules with peracetic acid such, for example, as 3,4-epoxy-6-methylcyclohexyl-methyl-3,4-epoxy-6-methylcyclohexanecarboxylates can also be used. Further, two or more of these compounds can be mixed and esterified.

In the invention process, an unsaturated monobasic acid is required for reacting with the epoxy compound and imparting to the latter the property making it copolymerizable with monomers. This type of unsaturated monobasic acids are exemplified by such as methacrylic acid, acrylic acid and crotonic acid.

As the unsaturated polybasic acids or their anhydrides, which are useable in the invention process, mention can be made of such, for example, as maleic anhydride, phthalic anhydride and itaconic acid. On the other hand, as the saturated monobasic and polybasic acids and anhydrides thereof, which can be used in the invention process, included are such, for example, as phthalic anhydride, tetrahydrophthalic anhydride, hexahydrophthalic anhydride, adipic acid, Het Acid and p-tert-butylbenzoic acid. Again, the phenols and quinones can be used in the invention process for preventing gelation during the reaction and, in addition, the compounds having polymerization inhibiting effects can also be used as a polymerization inhibitor, if necessary. As such a polymerization inhibitor, mention can be made of such, for example, as hydroquinone, hydroquinone monomethyl ether, benzoquinone, phenothiazine, thiosemicarbazide, acetone, thiocarbazone and the copper salts.

The solvents to be used in the invention process include such, for example, as benzene, ethyl alcohol, dipropyl ketone, ethyl acetate, dicarbitol, butyl lactate, diacetone alcohol, isopropyl cellosolve, perosene, acetal ethyl ether, acetoacetic acid and cellosolve acetate, which may be used singly or in combinations of two or more.

The polymerizable monomers useable in the invention process are exemplified by the following: acrylic esters, methacrylic esters, ethyrene, divinylbenzene, vinyl toluene, acrylonitrile, methacrylonitrile, cyclopentadiene, vinyl pyridine, vinyl acetate, diallyl phthalate, tetrahydrofurfuryl acrylate and tetrahydrofurfuryl methacrylate, which may be used singly or combinations of two or more.

In carrying out the reaction, the epoxy compound and the acid are used in such amounts that the total carboxyl groups of the acid is at least 0.1 mol to each mol of the epoxy group of the epoxy compound, a preferred range from the standpoint of the curability and properties of the resulting product being that where the total carboxyl groups is 0.2 – 1.2 mols. The amount used of the other components, such as the polymerization inhibitor, solvent and polymerizable monomer, can be varied in accordance with the curability, workability and properties requirements of the product.

For a better understanding of the invention the following examples are given, the parts indicated therein being in a weight basis.

EXAMPLES I – II AND CONTROLS I – IV

A reactor was charged with 860 parts of methacrylic acid and as the epoxy resin 2,000 parts of EPIKOTE 828 (a product of Shell Oil Company, U.S.A.). After conducting the reaction varying the catalyst used, 1,040 parts of styrene were added, and the curability was measured, with the results shown in Table 1.

The epoxy resin EPIKOTE 828 used in the reaction described hereinabove is a bisphenol type epoxy resin having the following formula

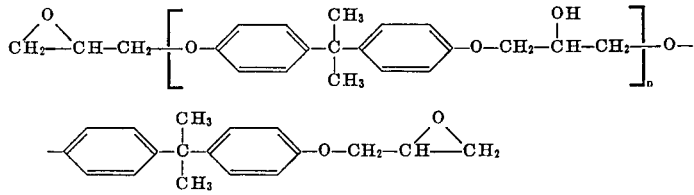

wherein $n$ is 0. It has an epoxy equivalent of 184 – 194, a viscosity (25°C.) of 120 – 150 poises and Gardener color of below 1.

TABLE 1

| Experiment No. | Class of catalyst | Reaction time, 120° C. (min.) | Reaction rate, percent | Viscosity poise, 25° C. | *BPO paste 1 pt. Gelation time | Dimethylaniline 0.1 pt. Minimum curing time | Maximum temperature of heat generated (° C.) | Preservability (20° C.) BPO paste 2 pt./100 pt. resin |
|---|---|---|---|---|---|---|---|---|
| Control I | Benzyldimethylamine, 11.2 pts | 180 | 100 | 3.75 | 8'45" | 12'15" | 168 | Gelled in 2 hrs., 20 min. |
| Control II | Triethylamine hydrochloride, 14.3 pts | 180 | 100 | 4.40 | 3'00" | 5'15" | 167.5 | Gelled in 50 min. |
| Example I | Diethylamine hydrochloride, 14.3 pts | 150 | 99.1 | 4.04 | 9'20" | 13'25" | 167 | 28 hrs. |
| Control III | Butylamine hydrochloride, 14.3 pts | 330 | 92.2 | 4.38 | 9'30" | 13'35" | 163 | Do. |
| Control IV | Tetramethylammonium chloride, 14.3 pts | 150 | 98.9 | 3.60 | 8'20" | 11'40" | 164 | 12 hrs. |
| Example II | Diethylamine formate, 14.3 pts | 147 | 99.3 | 3.60 | 9'10" | 13'20" | 170 | 29 hrs. |

*BPO paste (benzoyl peroxide paste) used was one whose content of BPO was 50%.
Unless otherwise specified, the BPO paste used hereinafter is of the same composition.

EXAMPLE III AND CONTROLS V – VII

Preparation of sample 1. A reactor was charged with 98 parts of maleic anhydride, 2,000 parts of EPIKOTE 828, 687 parts of methacrylic acid and 10 parts of dimethylamine hydrochloride, after which the reaction was carried out for 2 hours at 120° C. by heating the reactor on an oil bath. The acid value became practically zero. To 100 parts of this resin were added 35 parts of styrene and 0.01 part of hydroquinone to obtain an unsaturated ester resin whose viscosity at 25°C. was 7.8 poises and Gardener color was 3 – 4.

styrene and 0.01 part of hydroquinone were added to 100 parts of the resulting unsaturated ester to obtain an unsaturated ester resin whose viscosity at 25° C. was 11.3 poises. This resin was reddish brown in color and transparent. One-hundred parts of the so obtained resin incorporated with one part of a curing catalyst PERMEK N (trade name of a product of Nippon Oils and Fats Co., Ltd., Japan; principal ingredient methyl ethyl ketone peroxide) and one part of a curing accelerator cobalt napththenate gelled in 60 minutes at 25° C. It then hardened 2 hours later to yield a cast article which was not tacky. When this was cured for 2 hours at 100° C., the

TABLE 2

| Experiment Number | Sample | Curing agent-accelerator Class | Part | Gelation time (min.) | Minimum curing time (min.) | Maximum temperature of heat generated (° C.) |
|---|---|---|---|---|---|---|
| Example III | 1 | Methyl ethyl ketone peroxide* | 1.5 | 19.5 | 30.3 | 152 |
| | | Cobalt naphthenate ** | 1.0 | | | |
| Control V | 2 | do | 1.0 | (1) | (1) | (1) |
| Control VI | 1 | Benzoyl peroxide | 1.0 | 11.3 | 13.5 | 163 |
| | | Dimethylaniline | 0.1 | | | |
| Control VII | 2 | do | 0.1 | 10.2 | 12.8 | 164 |

* A dimethyl phthalate solution containing 55% methyl ketone peroxide.
** A solvent naphtha solution containing 6% of metallic cobalt.
1 Does not gel even after a lapse of 24 hours.

EXAMPLE IV AND CONTROLS VIII – X

Preparation of sample 3. One hundred forty-eight Parts of phthalic anhydride, 1,200 parts of EPIKOTE 828, 290 parts of acrylic acid and 5 parts of diethylamine boron trifluoride addition product were reacted for 1 hour and 40 minutes at 110°– 120°C. Since stirring became difficult during the latter stages of the reaction owing to a rise in the viscosity of the reaction mixture, 200 parts of styrene and 0.4 part of hydroquinone were added, followed by heating at 100° C. with stirring for a further 40 minutes. The acid values dropped to below 5.

The resulting sample had a Gardner color of 4 – 5 and a viscosity at 25C. of 17.8 poises.

Preparation of sample 4. Sample 4 was prepared by repeating the reaction for preparing sample 3, except that benzyl dimethylamine was used instead of diethylamine boron trifluoride addition product.

After adding one part of benzoyl peroxide to each of the samples 3 and 4, their pot life at 25° C. was measured, with the results shown in Table 3.

TABLE 3

| Experiment No. | Sample | Pot Life |
|---|---|---|
| Example IV | 3 | Gelled at the end of 1 week. |
| Control 8 | 4 | Gelled on the first day. |

However, when 0.2 part of dimethylaniline was added to each of the samples 3 and 4, their curability was as shown in Table 4. That is, there was practically no difference between the samples 3 and 4.

TABLE 4

| Experiment No. | Sample | Gelation Time (min) | Minimum curing time (min) | Maximum temperature of Heat generated (°C.) |
|---|---|---|---|---|
| Control IX | 3 | 7.2 | 10.2 | 161 |
| do X | 4 | 7.5 | 10.8 | 163 |

EXAMPLE V

When 1,850 grams of a novolak type epoxy resin DEN 438 (trade name of an epoxy resin manufactured by Dow Chemical Company U.S.A.), 860 grams of methacrylic acid and 15 grams of N-methylaniline sulfate were reacted for 3 hours at 120°C., the acid valve became practically zero. 35 Parts of deflection temperature under load, as measured by the ASTM method, was 170° C.

The DEN 438 used in the reaction described hereinbefore is an epoxy novolak resin having the formula

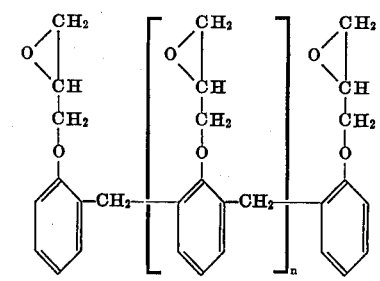

wherein $n \approx 1.6$. This resin has an epoxy equivalent of 175 – 182, a viscosity (52°C.) of 30,000 – 90,000 centipoises, and its color (maximum Gardener valve) was 3.

EXAMPLE V

A flask equipped with a thermometer, a stirrer and a reflux condenser was charged with 3,700 parts of a brominated epoxy resin DER 542 (trade name of an epoxy resin produced by Dow Chemical Company, U.S.A.), 860 parts of methacrylic acid, 25.1 parts of diethylamine acetate and 0.91 part of hydroquinone. The reaction was then carried out for 2 hours at 120°C. by heating the flask on an oil bath. The acid value was 5. Fifty parts of methyl methacrylate and 1,500 parts of styrene were added to the so obtained resin to obtained a self-extinguishing unsaturated epoxy ester resin. The properties of the resin thus obtained are shown in Table 5.

TABLE 5

| | |
|---|---|
| Color number | Gardener 6 |
| Viscosity (25°C.) | 3.3 poises |
| Curability (25°C.) | |
| Methyl ethyl ketone peroxide | 1.0 part |
| Cobalt naphthenate | 0.5 part |
| Gelation time | 18.5 min. |
| Minimum curing time | 28.7 min. |
| Maximum temp. of heat generated | 153°C. |
| Preservability | above 48 hours |

2 parts BPO paste/100 parts resin

The DER 542 resin used in the reaction hereinbefore described is a flame resistant brominated type epoxy resin having the formula

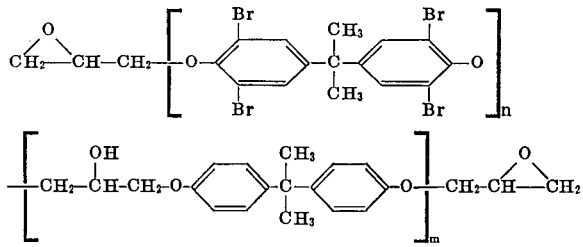

wherein n is 1 and m is 0. This resin has an epoxy equivalent of 350 – 400, a viscosity (52°C.) not measurable since it is a semi-solid (softening point of 51° – 61°C.), a Gardener color of 12 and a bromine content of 44 – 48 percent.

We claim:

1. In the process for producing unsaturated ester resins wherein an accelerator containing an organic peroxide and an organic salt of cobalt can be used in curing said resins, the improvement which comprises heat reacting an epoxy compound having at least two epoxy group in its molecular structure with an alpha-beta unsaturated monobasic acid in such amounts that the total carboxyl groups of the acid are between 0.2 and 1.2 mols to each mol of the epoxy group of the epoxy compound in the presence, as a catalyst, of an addition compound of a secondary amine selected from the group consisting of di(lower)alkyl amines having one to four carbon atoms in the alkyl group and N-methylaniline, and an acid selected from the group consisting of inorganic and organic acids.

2. The process according to claim 1 wherein said epoxy compound is a glycidyl ether synthesized from epichlorohydrin and a compound containing a hydroxyl group.

3. The process according to claim 1 wherein said unsaturated monobasic acid is selected from the group consisting of methacrylic acid and acrylic acid.

4. The process according to claim 1 wherein said addition compound is a member selected from the group consisting of dimethylamine hydrochloride, diethylamine hydrochloride, diethylamine formate, diethylamine acetate, diethylamine boron trifluoride addition product, dibutylamine hydrochloride and N-methylaniline sulfate.

5. In the process for producing unsaturated ester resins wherein an accelerator containing an organic peroxide and an organic salt of cobalt can be used in curing said resins, the improvement which comprises heat reacting an epoxy compound having at least two epoxy groups on its molecular structure, an alpha-beta unsaturated monobasic acid and a polymerizable monomer, the epoxy compound being present in such amounts that the total carboxyl groups of the acids are between 0.2 and 1.2 mols to each mol of epoxy group of the epoxy compound, said reaction occuring in the presence, as a catalyst, of an addition compound of a secondary amine selected from the group consisting of di(lower)alkyl amines having one to four carbon atoms in the alkyl group and N-methylaniline, and an acid selected from the group consisting of inorganic and organic acids.

6. The process according to claim 5 wherein said polymerizable monomer is at least one compound selected from the group consisting of acrylic esters, methacrylic esters and styrene.

7. In the process for producing unsaturated ester resins wherein an accelerator containing an organic peroxide and an organic salt of cobalt can be used in curing said resins, the improvement which comprises heat reacting an epoxy compound having at least two epoxy groups in its molecular structure, an alpha-beta unsaturated monobasic acid, and at least one member selected from the group consisting of saturated monobasic acids, saturated polybasic acids, saturated polybasic anhydrides, unsaturated polybasic acids and unsaturated polybasic anhydrides, the epoxy compound being present in such amounts that the total carboxyl groups of the acids are between 0.2 and 1.2 mols to each mol of epoxy group of the epoxy compound, said reaction occuring in the presence, as a catalyst, of an addition compound of a secondary amine selected from the group consisting of di(lower)alkyl amines having one to four carbon atoms in the alkyl group and N-methylaniline, and an acid selected from the group consisting of inorganic and organic acids.

8. In the process for producing unsaturated ester resins wherein an accelerator containing an organic peroxide and an organic salt of cobalt can be used in curing said resins, the improvement which comprises heat reacting an epoxy compound having at least two epoxy groups in its molecular structure, an alpha-beta unsaturated monobasic acid, at least one member selected from the group consisting of saturated monobasic acids, saturated polybasic acids, saturated polybasic anhydrides, unsaturated polybasic acids and unsaturated polybasic anhydrides, and a polymerizable monomer, the epoxy compound being present in such amounts that the total carboxyl groups of the acids are between 0.2 and 1.2 mols to each mol of epoxy group of the epoxy compound, said reaction occuring in the presence, as a catalyst, of an addition compound of a secondary amine selected from the group consisting of di(lower)alkyl amines having one to four carbon atoms in the alkyl group and N-methylaniline, and an acid selected from the group consisting of inorganic and organic acids.

9. In the process for producing unsaturated ester resins wherein an accelerator containing an organic peroxide and an organic salt of cobalt can be used in curing said resins, the improvement which comprises heat reacting an epoxy compound having at least two epoxy groups in its molecular structure, an alpha-beta unsaturated monobasic acid, and a polymerizable monomer, the epoxy compound being present in such amounts that the total carboxyl groups of the acids are between 0.2 and 1.2 mols to each mol of epoxy group of the epoxy compound, said reaction occuring in the presence, as a catalyst, of an addition compound of a secondary amine selected from the group consisting of di(lower)alkyl amines having one to four carbon atoms in the alkyl group and N-methylaniline, and an acid selected from the group consisting of inorganic and organic acids, and thereafter making a further addition of the polymerizable monomer.

10. In the process for producing unsaturated ester resins wherein an accelerator containing an organic peroxide and an organic salt of cobalt can be used in curing said resin, the improvement which comprises heat reacting an epoxy compound having at least two epoxy groups in its molecular structure, an alpha-beta unsaturated monobasic acid, at least one member from the group consisting of saturated monobasic acids, saturated polybasic acids, saturated polybasic anhydrides, unsaturated polybasic acids and unsaturated polybasic anhydrides, and a polymerizable monomer, the epoxy compound being present in such amounts that the total carboxyl groups of the acids are between 0.2 and 1.2 mols to each mol of epoxy group of the epoxy compound, said reaction occuring in the presence, as a catalyst, of an addition compound of a secondary amine selected from the group consisting of di(lower)alkyl amines having one to four carbon atoms in the alkyl group and N-methylaniline, and an acid selected from the group consisting of inorganic and organic acids, and thereafter making a further addition of the polymerizable monomer.

* * * * *